United States Patent [19]

Nakagawa

[11] Patent Number: 4,812,649

[45] Date of Patent: Mar. 14, 1989

[54] CONTROL IN MASS ANALYZER

[75] Inventor: Katsuhiro Nakagawa, Katsuta, Japan

[73] Assignee: Hitachi, Ltd., Tokyo, Japan

[21] Appl. No.: 105,251

[22] Filed: Oct. 7, 1987

[30] Foreign Application Priority Data

Oct. 8, 1986 [JP] Japan ................................ 61-239944

[51] Int. Cl.⁴ ................................................ B01D 59/44

[52] U.S. Cl. ..................................... 250/296; 250/281; 250/299

[58] Field of Search ............... 250/281, 282, 283, 294, 250/296, 299, 300, 423 R, 424

[56] References Cited

U.S. PATENT DOCUMENTS

| | | | |
|---|---|---|---|
| 2,945,126 | 7/1960 | Brubaker et al. | 250/296 |
| 2,975,278 | 3/1961 | Brubaker et al. | 250/300 |
| 3,487,208 | 12/1969 | Futrell et al. | 250/296 |
| 4,754,200 | 6/1988 | Plumb et al. | 315/111.1 |

*Primary Examiner*—Bruce C. Anderson

*Assistant Examiner*—Michael Aronoff

*Attorney, Agent, or Firm*—Antonelli, Terry & Wands

[57] ABSTRACT

In a mass analyzer, an acceleration voltage is applied to an ionization chamber in which a voltage to be applied to repeller electrodes to repel ions is generated with reference to the acceleration voltage and a repeller voltage source is linked with a controller by use of a photocoupler or the like such that the repeller voltage is adjusted with the repeller voltage source electrically insulated from the controller. The repeller voltage can be easily and automatically adjusted by use of a low-voltage control signal so as to obtain a sensitivity developing the maximum value of the quantity of detected ions and hence a qualitative or quantitative analysis of a sample can be achieved with a high sensitivity. The controller processes digital signals and appropriate parameters are stored in a memory. Each parameter is changed with the center of change set to an appropriate parameter previously used and consequently the automatic control is simplified.

5 Claims, 5 Drawing Sheets

CONTROL IN MASS ANALYZER

BACKGROUND OF THE INVENTION

1. Field of the Invention

The present invention relates to a mass analyzer for classifying a substance according to a mass thereof, and in particular, to control of ejection of ions from an ion source of the mass analyzer.

2. Description of the Related Art

A mass analyzer classifying a substance depending on a mass thereof has been used in apparatuses such as a mass spectrometer analyzing components of a sample in the qualitative and quantitative fashions, an ion implant apparatus implanting predetermined ion species, and a secondary ion mass spectrometer (SIMS) analyzing secondary ions.

For the classification of substances in an ion beam by the mass of each substance, there have been known a method using a combination of an electric field and a magnetic field and a method using a quadrupole.

In order to generate an ion beam, ions are produced in an ionization chamber associated with an ion source and a voltage having a predetermined polarity with respect to an inner wall (including an emission slit) of the ionization chamber so as to repel the ions is applied to a repeller electrode in the ionization chamber, thereby outputting an ion beam for the emission slit of the ionization chamber. When an acceleration voltage is applied across the ionization chamber and an electric lens, the electric beam is accelerated so as to be passed through the lens. The accelerated ion beam is shaped in the lens system to obtain an ion beam having a predetermined shape. Thereafter, using a quadrupole or a combination of an electric field and a magnetic field, the ion beam is dispersed and then only desired ion species are converged depending on the mass. Incident ions are detected by a detector to measure the amount of ions, which is then analyzed by a data processing system, thereby effecting the qualitative and quantitative analyses of the sample. In a case of an ion implantation, ions are implanted into a target. Also in this case, the amount of ions must be measured. For the quantitative accuracy, it is desired to generate an ion beam which includes a fixed amount of ions and preferably contains the maximum available amount thereof in any cases. To this end, it is a common practice to adjust a potential of the repeller electrode with respect to the potential of the ionization chamber. Incidentally, an acceleration voltage having a voltage of about ±4 kV with respect to the ground potential is applied to the ionization chamber. Namely, the voltage of the repeller electrode is at most ±10 V with respect to the voltage of the ionization chamber (i.e. the reference voltage) and is higher than the ground voltage by about ±4 kV. Consequently, care must be exercised for the high-voltage operation.

The JP(UM)-A-No. 53-24685 has disclosed a variable resistor for controlling a repeller voltage onto which such an acceleration voltage is imposed. A mechanical rotary shaft of the variable resistor is extended by means of an extension member made of an insulating material so as to be linked with a dial disposed in an operator's panel, thereby increasing a distance between the operator's panel and the variable resistor to which a high voltage is applied.

SUMMARY OF THE INVENTION

It is therefore an object of the present invention to provide a mass analyzer capable of efficiently controlling the amount of ions.

Another object of the present invention is to provide a mass analyzer having a high sensitivity.

Still another object of the present invention is to provide a mass analyzer capable of automatically controlling the amount of ions to be set to the maximum value.

Further another object of the present invention is to provide a mass analyzer which can automatically adjust the repeller voltage and which can analyze a sample with a high sensitivity.

When changing a voltage of several thousand volts in a range of several tens of volts, the handling of the voltage control will be facilitated if the reference voltage is not set to a potential near the objective potential, namely, the common grounding potential is not used as the reference potential.

In order to set the reference voltage to a variable potential other than the common ground potential, the reference potential must be separated from the common ground potential with respect to the direct current (dc).

According to one aspect of the present invention, there are provided a controller controlling a voltage of a repeller electrode and a dc insulating section between the repeller electrode and the controller such that a data processing unit or a data processor effects processing based on an amount of ions detected by a detector, thereby adjusting the voltage through the controller and the dc insulating section to attain a maximum value of the ion quantity. The dc insulating section desirably transmits information by use of an optical signal.

In a sense of a direct current, the repeller electrode is insulated from the controller by means of the insulating section disposed therebetween. The data processing unit changes data sent to the controller so as to adjust the voltage controlling the repeller electrode, thereby obtaining a maximum value of quantity of the detected ions.

BRIEF DESCRIPTION OF THE DRAWINGS

The present invention will be apparent from the following detailed description taken in conjunction with the accompanying drawings in which.

1 is a schematic diagram illustrating the basic structure of an embodiment of a primary section of a mass analyzer according to the present invention.

DESCRIPTION OF THE PREFERRED EMBODIMENTS

Figure 1:
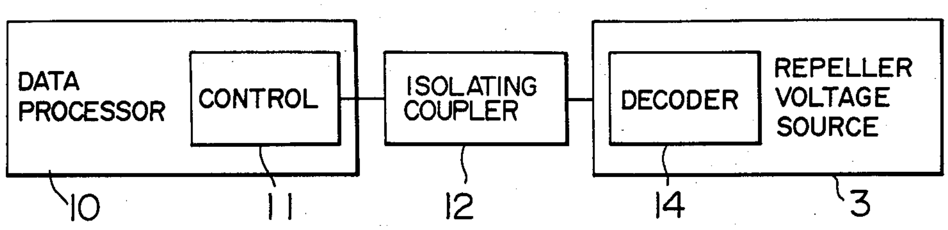

FIG. 1 is a block diagram schematically showing a basic configuration of the primary section of a controller of a mass analyzer in which a repeller voltage or power source 3 is coupled to a controller 11 in a data processing unit 10 by means of an insulating link section 12 insulating therebetween with respect to a direct current and linking therebetween in a sense of information. When the data to set a repeller voltage is supplied from the data processing unit 10 to the controller 11, the setting data is sent from the controller 11 to the insulating coupler section 12, which then transfers the setting data to a decoder 14 of the repeller voltage source 3. In this operation, an input side of the insulating link section 12 is insulated with respect to a direct current from an output side thereof. The decoder 14 converts the setting data thus received into an analog control voltage corresponding thereto, which causes to output a corresponding repeller voltage. The decoder 14 may be formed of a digital-to-analog (D/A) converter.

The insulating link section 12 preferably includes a converter converting electric signals into optical signals and a photoelectric converter effecting a reversed operation for communicating information signals by means of light. In this situation, the repeller voltage in an ion source is represented by a digital signal, which is communicated in a form of a light signal and is then reproduced as a voltage to be superimposed onto an acceleration voltage, which may reach several thousand volts.

Figure 2:
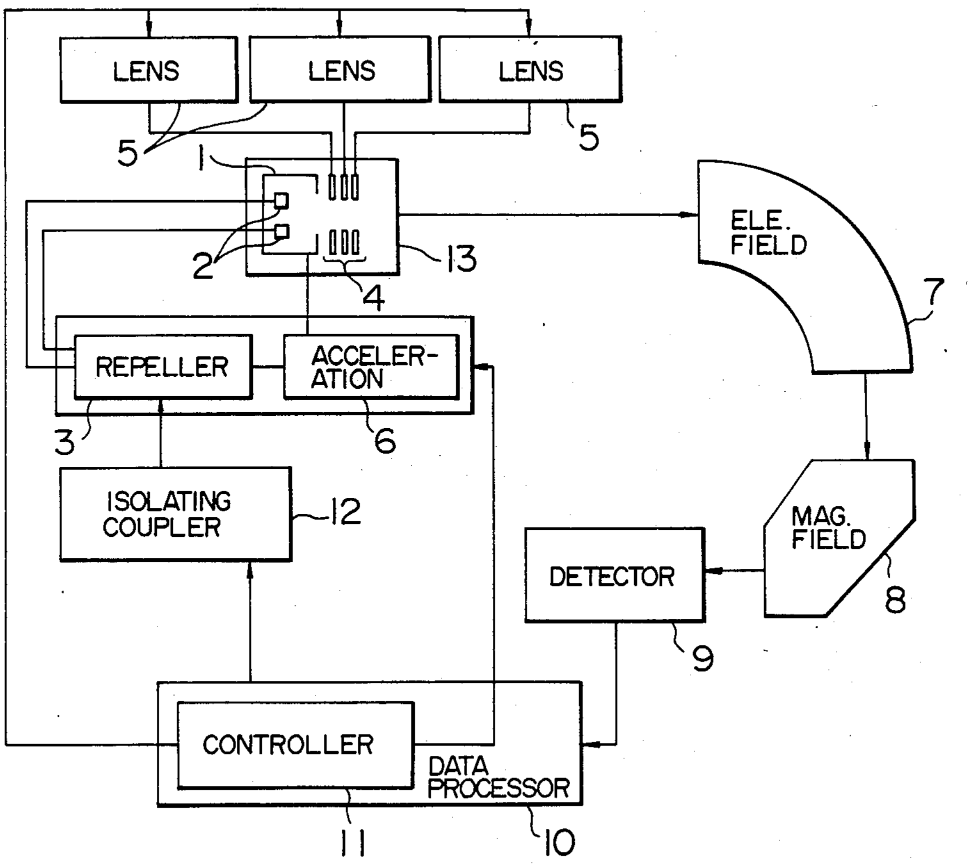
FIG. 2 is an overall configuration diagram shcematically showing an embodiment of a mass analyzer to which the present invention is applied.

FIG. 2 is a schematic diagram showing the overall configuration of a mass analyzer in which ions produced in an ionization chamber 1 are repelled by a repeller voltage applied from a repeller voltage source 3 to repeller electrodes 2. An acceleration voltage is applied from an acceleration voltage source 6 to an internal wall of the ionization chamber 1. Consequently, the repelled ions are accelerated by the acceleration voltage applied across the ionization chamber 1 and a lens system 4 and are thereafter emitted as an ion beam. The ions emitted from the ionization chamber 1 undergo an operation of a lens developed by a lens voltage applied from a lens voltage source 5 to the lens electrodes 4, which cause an ion beam having a predetermined shape to be emitted from an ion source 13. The ion beam is fed into an electric field 7 and is then dispersed according to a quantity of m/e in a combination of the electric field 7 and a magnetic field 8 so as to be delivered to a detector 9. The detector 9 detects the amount of the ions incident thereto and supplies the detected value to the data processing unit or data processor 10. Depending on the factor of m/e and the quantity of the detected ions, a qualitative or quantitative analysis is achieved on a sample located in the ionization chamber 1.

Although two repeller electrodes 2 are shown in FIG. 2, the number of the repeller electrodes is not limited to two, namely, the number may be one or may exceed two. Similarly, although three pairs of lens electrodes 4 are shown, the number of the pairs is not limited to three. In a case of three pairs of lens electrodes 4, one pair may be used to effect the control in the longitudinal direction of the slit and the remaining two pairs may be disposed to achieve the control in a direction along the width of the slit.

The quantity of the ions detected by the detector 9 depends on the amount and shape of the ion beam emitted from the ion source and other characteristics. For a higher accuracy of the measurement, it is favorable to increase the quantity of ions received by the detector 9.

In a qualitative or quantitative analysis of a sample, the data processor 10 processes information based on the ion quantity detected by the detector 9 such that the controller 11 outputs data to set the repeller voltage and the lens voltage so as to obtain the maximum value of the ion quantity. The data to set the repeller voltage from the controller is transferred via the insulating link section 12 to the repeller voltage source 3. In the repeller voltage source 3, the setting data is converted into a corresponding repeller voltage by means of a D/A converter (denoted by reference numeral 14 in FIG. 1). The controller 11 also sends the similar setting data to the lens voltage source 5 so as to attain a lens voltage corresponding to the setting data. In addition, the controller 11 also generates a control signal for the acceleration voltage source 6.

The repeller electrodes 2, the ionization chamber 1, and the lens electrodes in the ion source 13 respectively receive corresponding control voltages from the repeller voltage source 3, the acceleration voltage source 6, and the lens voltage source 5.

Figure 3:
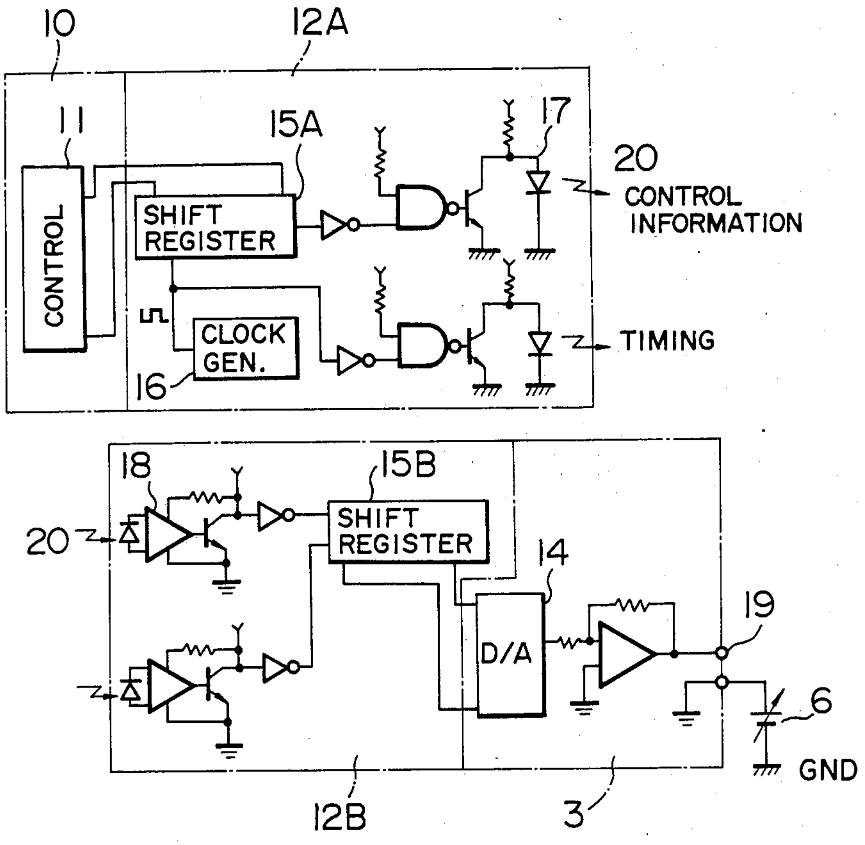
FIG. 3 is a schematic diagram illustrating the insulating section in detail.

FIG. 3 is a diagram showing a coupler for an electric insulating signal. The coupler includes a transmit section 12A and a receive section 12B. In the transmit section 12A, data (comprising a plurality of parallel bits) outputted from the controller 11 to set the repeller voltage is set to a shift register 15A. The setting data is converted into a serial signal comprising a plurality of serial bits by use of a clock signal fed from an oscillator 16 so as to be delivered to an LED of a transmitter 17, thereby transmitting an optical signal from the LED. The clock signal is also sent as an optical signal from an LED.

In the receive section 12B, the optical signal sent from the transmitter 17 is received by a photocell of a receiver 18 to sequentially set the corresponding data to a shift register 15B on the output side. The signal in the shift register 15B is inputted to a D/A converter 14 in a bit-parallel fashion so as to be converted into an analog control signal. The reference voltage of the receive section 13 is the acceleration voltage of the acceleration voltage source 6, namely, a voltage from a terminal 19 relative to the ground potential GND is obtained by superimposing the repeller voltage onto the acceleration voltage 6. Although the transmit section 12A is linked to the receive section 12B by use of an optical signal 20, these sections 12A–12B are separated from each other in a sence of a dc potential.

As a consequence, even if the repeller voltage is set to a high potential due to the superimposition of the acceleration voltage, the data to set the repeller voltage represents a voltage of the repeller electrode 2 relative to the voltage of the ionization chamber 1 and is transmitted as an optical signal between the transmitter 17 and the receiver 18. The controller 11 is electrically insulated from the repeller voltage source 3 to a satisfactory degree. As a result, a high voltage difference need not be considered in the operation and the repeller voltage can be automatically adjusted by a low-voltage signal through the controller.

In addition, the adjustment of the voltage is achieved by an optical signal and an electric signal namely, a mechanical adjustment is dispensed with.

Figure 4:
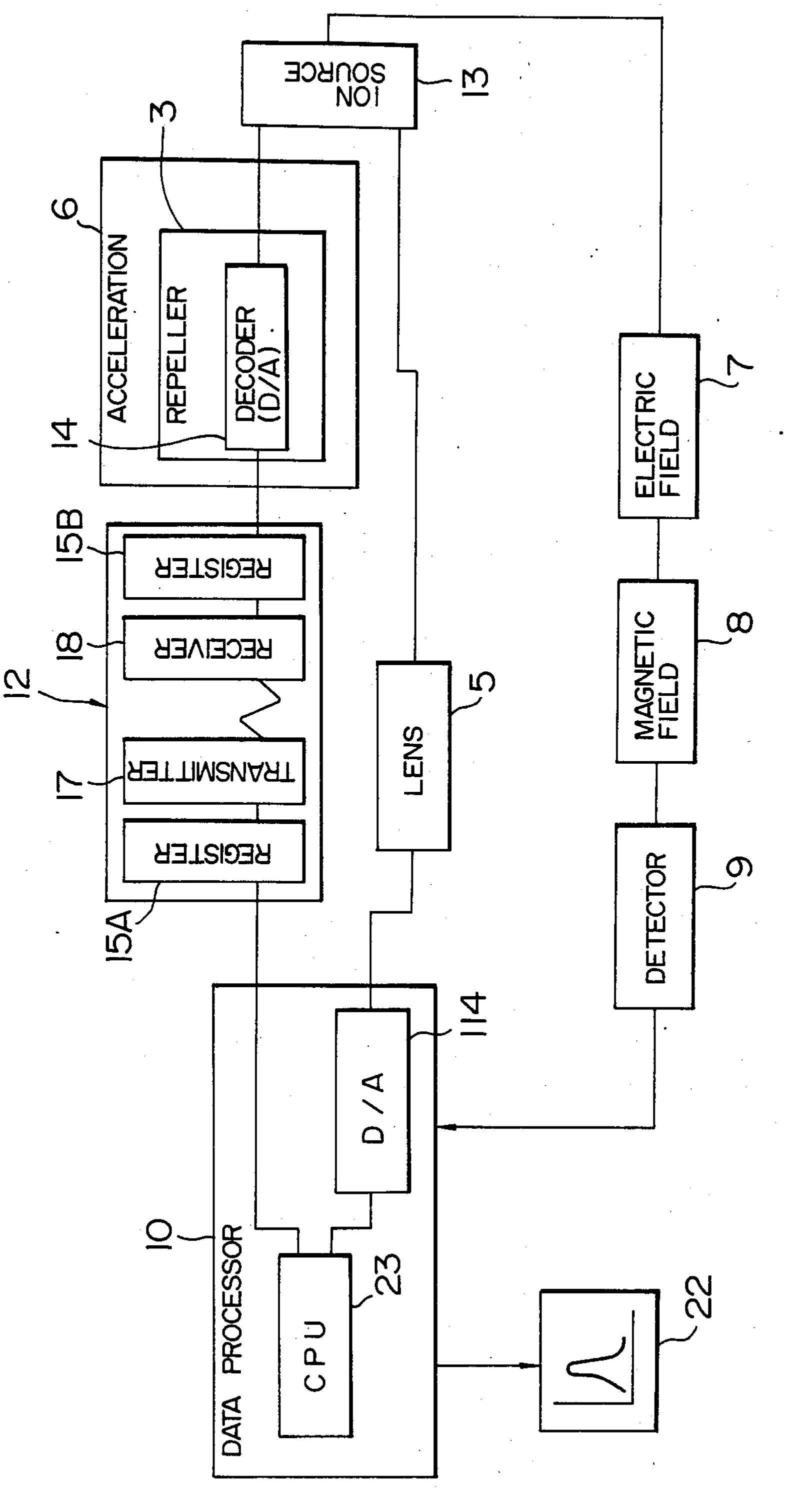
FIG. 4 is a schematic diagram showing a control system controlling the repeller voltage and the lens voltage.

FIG. 4 is a block diagram showing a control system of the repeller voltage and the lens voltage. In addition to the repeller and lens voltages, the acceleration voltage is also included in the voltages controlling the ion beam; however, since the acceleration voltage is not changed when the sensitivity (yield) is to be adjusted, the configuration associated with the acceleration voltage is not shown.

The data processor 10 includes a central processing unit (CPU) 23 and a D/A converter 114. The CPU 23 calculates data for the repeller voltage so as to supply a control signal via an electric insulation signal coupler 12 to the repeller voltage source 3 onto which the acceleration voltage source 6 is superimposed. As described above, in the coupler 12, the input side is separated from the output side with respect to the dc potential.

In contrast, since the lens voltage is not superposed on the accelerating voltage, although it is high voltage having a specific ratio to the accelerating voltage, electric isolation need not be provided thereto. Digital data from the CPU 23 is converted into an analog quantity by the D/A converter 114 and then the obtained analog quantity is used to control the lens voltage source 5, thereby adjusting the lens voltage applied to the ion source 13. The ion beam from the ion source 13 is dispersed through the electric field section 7 and the magnetic field section 8 according to the factor of mass/electric charge (m/e) and thereafter is detected by the detector 9. Based on the output from the detector 9, the processor 10 displays the spectrum representing relationships between the ion quantity and the factor of mass/electric charge in one hand and effects on the other hand an automatic adjustment of the repeller and lens voltages.

Figure 5A:
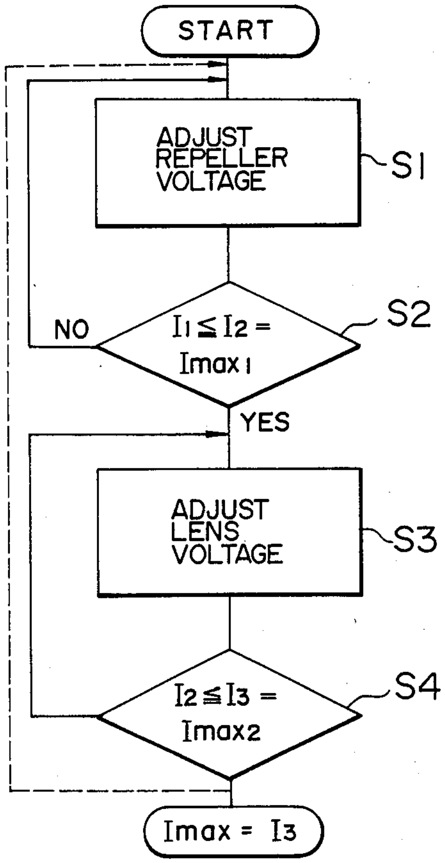
FIGS. 5A–5C are respectively a flowchart of the data processing unit to effect an automatic adjustment of the repeller voltage and the lens voltage, a spectrum graph useful to explain the operation, and a block diagram of main components of the data processing unit.

FIG. 5A is a flowchart showing a processing procedure of the data processor 10 to automatically adjust the ion quantity detected by the detector to the maximum value.

Figure 5B:
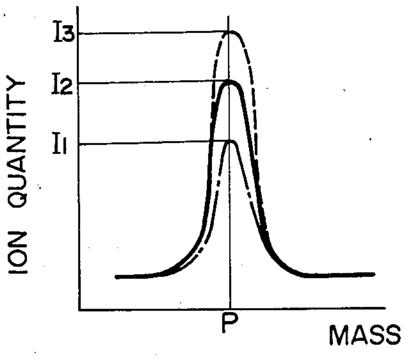
Figure 5C:
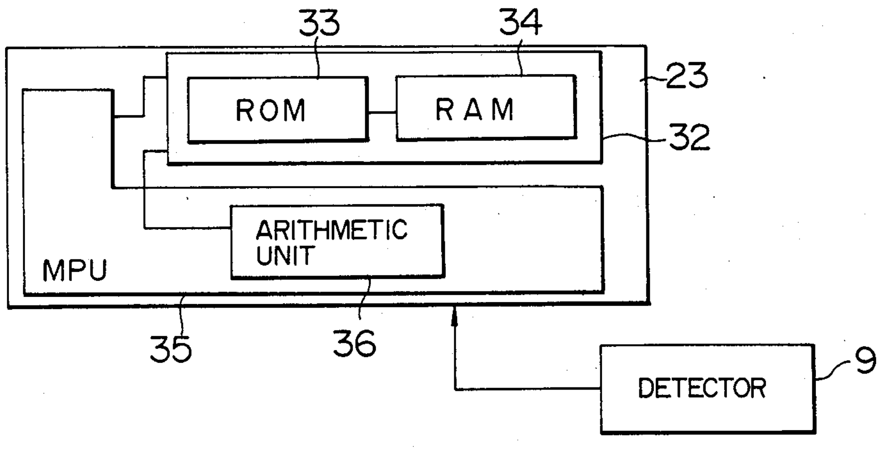

FIG. 5B is a graph schematically illustrating a change of the spectrum during the automatic adjustment, whereas FIG. 5C is a schematic diagram showing a configuration of the control circuit 23 executing the program of FIG. 5A.

Assume that the spectrum having the intensity $I_1$ of FIG. 5B is attained when a sample is analyzed by the mass analyzer. In this situation, the data processor 10 effect a scanning operation by changing the repeller voltage in a range from about $-10$ V to about $+10$ V (step S1) to determine a point where the detected ion quantity is $I_1 \leqq I_2$ and the maximum value is developed as $$I_1 \leqq I_2 = I_{MAX1},$$

thereby adjusting the repeller voltage to a value for which the $I_{MAX1}$ is obtained (step S2).

Next, the lens voltages are respectively changed in a range from about 0 V to about +4 kV (step S3) to determine a point where the detected ion quantity is $I_2 \leqq I_3$ and the maximum value is developed as $I_{MAX2} = I_3$, thereby adjusting the lens voltages (step S4).

Although the procedures above enable to attain the substantially best sensitivity, a portion of or the whole procedures may be repetitiously achieved in the similar fashion. As a result, a sample can be analyzed with the best sensitivity. Incidentally, the spectra of the detected ion quantities are displayed in a display equipment 22 of FIG. 4.

In FIG. 5C, a memory 32 includes an ROM 33 in which a program of FIG. 5A and other information are recorded and an RAM 34 in which data etc. are stored. A micro-processing unit (MPU) 35 comprises an arithmetic unit 36 to accomplish arithmetic operations like the steps S2 and S4 of FIG. 5A.

Figure 6A:
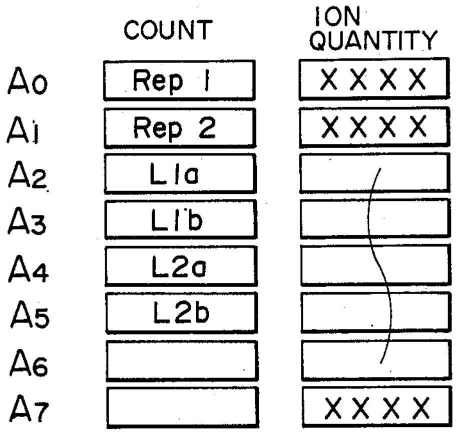
FIGS. 6A–6B are respectively a table stored in a memory in the data processing unit and a graph illustrating relationships between the ion quantity and the count.
Figure 6B:
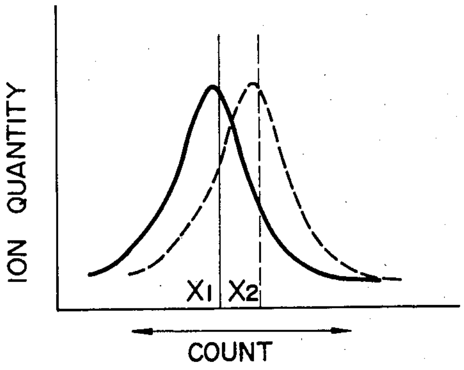

Referring now to FIGS. 6A–6B, a description will be given of a control using a memory.

FIG. 6A is a diagram showing a table allocated in the memory 32. Each control voltage is represented by a digital signal like a signal loaded in the registers of FIG. 3. The voltage is expressed in a form of a count and the detected ion quantity related to the count is stored in the table. Rows $A_0$–$A_1$ store data of the two repeller electrodes, whereas rows $A_2$–$A_7$ are loaded with data of the three pairs of lens electrodes. When the respective parameter (count) are changed, the detected ion quantity varies as shown in FIG. 6B. As a result, the obtained optimal value (count) $X_1$ is stored in the memory 32. Even when a condition such as the quantity of sample, the ionization method, or the cleanliness of the apparatus is changed, a new scanning operation need not be accomplished through the entire voltage range (e.g. $\pm 10$ V in a case of the repeller voltage), namely, the voltage scanning is effected with the optimal value $X_1$ as the center of the scanning in a range of $\frac{1}{3}$ or favorably 1/10 of the entire voltage range $X_{MIN}$, $X_{MAX}$) so as to determine a new optimal value $X_2$. This value $X_2$ is assumed to be a new reference value and is then stored in place of the preceding reference value $X_1$.

Since the scanning range is reduced, the period of time required for the adjustment can be minimized. Consequently, when the automatic adjustment is specified, the apparatus can be set to the state in which the best sensitivity is developed in any cases.

While the present invention has been described with reference to the particular illustrative embodiments, it is not restricted by the embodiments but by the appended claims. It is to be appreciated that those skilled in the art can change and modify the embodiments without departing from the scope and and spirit of the invention.

I claim:

1. A mass analyzer comprising:

an ionization chamber for generating ions;

repeller means including a repeller voltage source for repelling the generated ions by a repeller voltage produced by said repeller voltage source;

acceleration means including an acceleration voltage source for accelerating the generated ions by an acceleration voltage produced by said acceleration voltage source;

lens means including a lens voltage source for controlling the generated ions by a lens voltage applied from said lens voltage source;

field means for providing an electric field and a magnetic field for cooperatively converging incident ions;

detector means for detecting the converged ions;

data processor means for effecting a qualitative analysis or a quantitative analysis of a sample based on a quantity of the detected ions;

controller means for controlling output voltages from said repeller voltage source, said acceleration voltage source, and said lens voltage source, said output voltages each being a floating voltage due to a high-voltage acceleration voltage from said acceleration voltage source; and an insulating section means for electrically insulating said repeller voltage source from said controller means; wherein said data processor means sets the output voltage of said repeller voltage source via said controller means and said insulating section means such that the ion quantity develops a maximum value depending on the ion quantity thus detected.

2. A mass analyzer comprising:

an ionization chamber to which a high voltage is applied;

repeller electrodes to which a voltage is applied to repel ions in said ionization chamber;

repeller voltage source means for generating the voltage applied to said repeller electrodes with a potential of said ionization chamber set as a reference;

controller means for generating parameters for controlling the repeller voltage;

an insulating link section means for electrically insulating said repeller voltage source means from said controller means and for linking said repeller voltage source means with said controller means by use of an information signal; and detector means for detecting ions; wherein said controller means effects a predetermined arithmetic processing based on the ion quantity detected by said detector means so as to determine said parameters.

3. A mass analyzer according to claim 2, wherein said controller means includes a memory means for storing therein parameters used by a previous analysis.

4. A mass analyzer according to claim 3, wherein said memory means stores an automatic control program and includes a table in which parameters used are stored, and said automatic control program reads the parameters from said table for an execution thereof.

5. A mass analyzer according to claim 2, further including:

lens electrodes to which a voltage is applied to control a shape of an ion beam, and a lens voltage source means for generating a voltage to be applied to said lens electrodes; wherein said controller means supplies said lens voltage source means with a signal controlling the lens voltage.

* * * * *